(12) United States Patent  (10) Patent No.: US 6,685,862 B1
Hanagan  (45) Date of Patent: Feb. 3, 2004

(54) METHOD OF MAKING A VEHICLE SEAT (75) Inventor: Michael W. Hanagan, Hollister, CA (US)

(73) Assignee: Corbin Pacific, Inc., Hollister, CA (US)

( * ) Notice: Subject to any disclaimer, the term of this patent is extended or adjusted under 35 U.S.C. 154(b) by 0 days.

(21) Appl. No.: 10/229,469

(22) Filed: Aug. 28, 2002

(51) Int. Cl.[7] .............................................. B29C 45/16
(52) U.S. Cl. ...................... 264/241; 264/259; 264/292; 156/213; 4/237
(58) Field of Search ................................. 264/269, 241, 264/45.1, 46.6, 250, 255, 259, 267, 279, 292; 156/245, 213; 4/237, 234

(56) References Cited

U.S. PATENT DOCUMENTS

| 3,325,329 A | * | 6/1967 | Bolesky ..................... 156/216 |
| 3,854,150 A | * | 12/1974 | Samuels et al. .................. 4/237 |
| 3,863,277 A | * | 2/1975 | Harrison ........................ 4/237 |
| 4,046,611 A | | 9/1977 | Sanson |
| 4,115,170 A | | 9/1978 | Sanson |
| 4,174,988 A | * | 11/1979 | Moore et al. ................. 156/213 |
| 4,462,634 A | | 7/1984 | Hanagan |
| 4,525,231 A | * | 6/1985 | Wnuk ......................... 156/185 |
| 4,542,887 A | | 9/1985 | Bethell et al. |
| 4,833,741 A | | 5/1989 | Mizuno et al. |
| 4,840,430 A | * | 6/1989 | Shimada ................. 297/452.61 |
| 4,873,036 A | | 10/1989 | Urai |
| 4,923,653 A | | 5/1990 | Matsuura et al. |
| 4,953,911 A | | 9/1990 | Hanagan |
| 4,959,184 A | | 9/1990 | Akai et al. |
| 5,017,115 A | | 5/1991 | Yanagishita et al. |
| 5,324,462 A | | 6/1994 | Rohn |
| 5,400,490 A | | 3/1995 | Burchi |
| 5,544,937 A | | 8/1996 | Hanagan |
| 5,608,957 A | | 3/1997 | Hanagan |
| 5,622,402 A | | 4/1997 | Pritchard et al. |
| 5,804,511 A | | 9/1998 | Kelman et al. |
| 5,988,757 A | | 11/1999 | Vishey et al. |

* cited by examiner

Primary Examiner—Michael Colaianni
Assistant Examiner—Monica A Fontaine (57) ABSTRACT An efficient method for making a vehicle seat. A vehicle seat is molded in a mold set which includes a base element and a series of upper elements with the cover supported in the mold cavity and layers of resins being molded thereon. The resultant seat, which is particularly well-suited for use on motorcycles, includes a cover, a cellular cushioning layer self-bonded directly to the cover, a generally ring-shaped support element disposed on the cellular cushioning layer, and a seat base layer self-bonded directly to the cellular cushioning layer and the skirt portion of the cover layer.

8 Claims, 12 Drawing Sheets

METHOD OF MAKING A VEHICLE SEAT

BACKGROUND OF THE INVENTION

The present invention relates to vehicle seats, and more particularly to a multi-layer vehicle seat that is made and assembled without requiring adhesives. The invention also relates to a method of making such vehicle seats.

Seats for vehicles such as motorcycles usually have a supporting base layer, a cushion layer, and an exterior cover layer. Traditionally, a molded cushion is formed on the base layer and a cover is stitched and fitted over the cushion. While seats of this type are high in quality and have excellent durability, it would be useful to develop a seat of similar quality which can be formed more efficiently.

It is an object of the invention to provide a novel method for making a durable vehicle seat at a reduced production cost.

Another object is to provide a vehicle seat that can be fabricated without the use of adhesive coatings.

A further object is to provide a method for a high quality vehicle seat that can be molded using a mold set comprised of a base mold and a multiplicity of separate upper molds.

Yet another object is to provide a method of making a vehicle seat which results in minimal emissions of volatile oxygen compounds (VOCs).

SUMMARY OF THE INVENTION

It has now been found that the foregoing and related objects may be readily attained in a novel method of making a vehicle seat. The method comprises the steps of providing a seat mold having a lower element, and a plurality of upper elements, applying a seat cover to the surface of the lower element of the seat mold, the seat cover including a seating portion and a skirt portion extending upwardly along the inside periphery of the lower element of the mold and outwardly thereof, introducing a first foamable synthetic resin into the lower element on the seating portion of the seat cover, interfitting a first upper element of the seat mold on the lower element, and at least partially curing the first foamable synthetic resin to form a cushioning layer. The first upper mold element is removed, and a generally ring-shaped support element is formed on the cushioning layer about its periphery. The skirt portion of the seat cover is then folded inwardly over the generally ring-shaped support element, and a second synthetic resin is introduced into the lower element of the seat mold on the first foamable synthetic resin. A second upper mold element of the mold is interfitted on the lower element of the mold, and the second synthetic resin is cured to produce the seat base layer. Any additional curing required for the first synthetic resin takes place simultaneously. The vehicle seat is then removed from the mold.

Preferably, the generally ring-shaped support layer is reaction injection molded directly onto the cushioning layer. The step of forming a generally ring-shaped support layer preferably includes the steps of interfitting a ring-forming upper mold element on the lower element of the seat mold, injecting a reaction injection moldable resin into the mold between the ring-forming upper element and the cushioning layer, and removing the ring-forming upper element. The reaction injection moldable material bonds to the cushion layer during reaction.

In one preferred form of the invention, the second upper element has hardware receiving cavities therein in which are placed seat hardware. In this embodiment, the step of interfitting the second upper mold element on the lower element of the mold embeds the seat hardware into the second synthetic resin.

Thus, it can be seen that vehicle seat has the cellular cushioning layer self-bonded directly to the cover, and the generally ring-shaped support element disposed adjacent to the cushioning and is self bonded to it. The seat base layer self-bonded directly to the cushioning layer and to the generally ring-shaped support element and the skirt portion of the cover.

The cushioning layer preferably comprises a foamed thermoset resin, and more preferably comprises a thermosetting polyurethane. The seat base layer preferably comprises a thermosetting resin. Desirably, the cover layer comprises natural leather, a synthetic resin sheet material or canvas.

Other features of the present invention, including the methods and operation, related elements of the structure, combination of parts and economics of manufacture will become apparent upon consideration of the following description and claims with reference to the accompanying drawings.

DETAILED DESCRIPTION OF THE PREFERRED EMBODIMENTS

Figure 1:
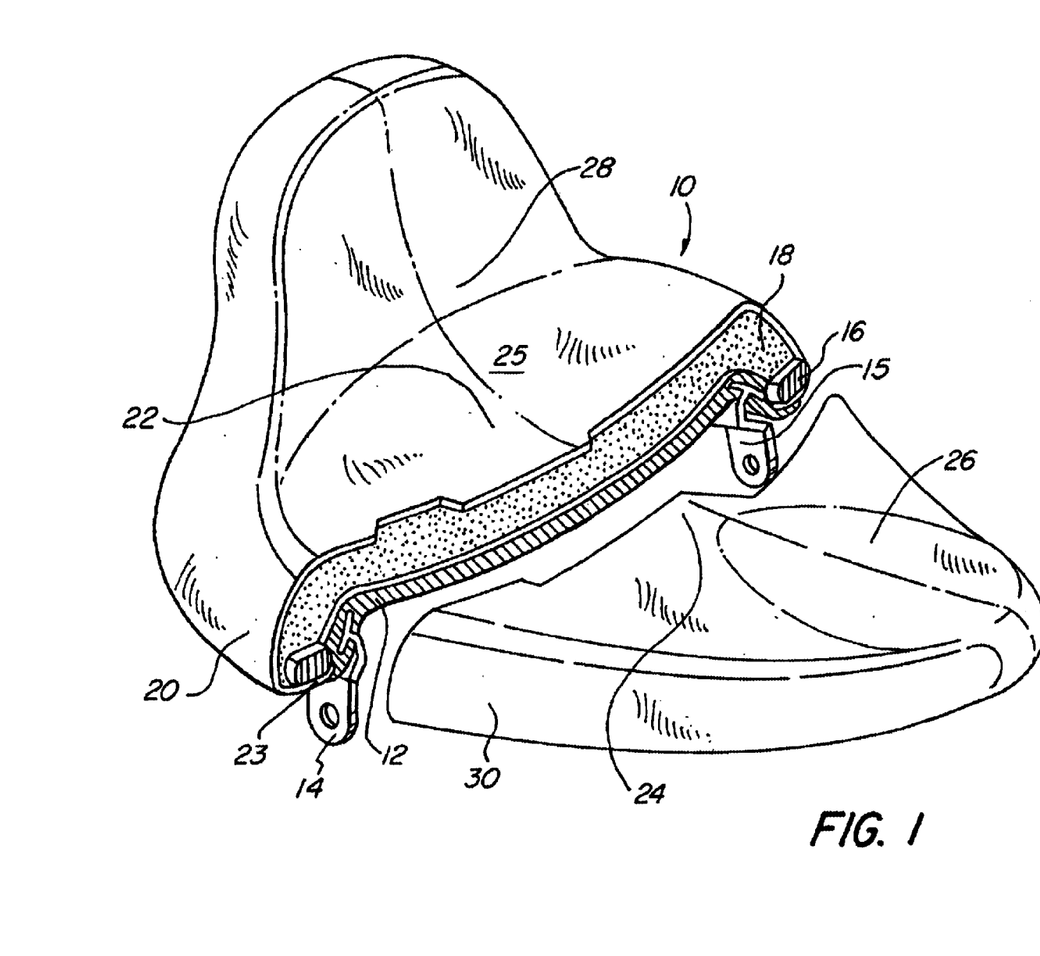
FIG. 1 is a perspective view of a motorcycle seat according to the invention, which is the seat being broken apart and in partial cross section to show the interior structures.

Turning first to FIG. 1, a vehicle seat embodying the present invention is generally designated by the numeral 10. The seat 10, which preferably is a motorcycle seat, includes a seat base layer or platform member 12 that is configured to be secured to the frame or chassis of a motorcycle by brackets 14, 15. The seat base layer 12 is formed from a strong, moldable resin, preferably a polyurethane. A support ring shaped element 16 extends around the perimeter of the seat 10 on the seat base layer 12. The support ring 16 provides the seat with structural integrity and supports a cushioning layer 18. The cushioning layer 18 extends across the top and sides of the seat 10 and provides comfort to the rider. The cushioning layer 18 is formed from a resiliently deflectable cellular foamed synthetic resin or any other moldable, resiliently deformable foam material. The seat base layer 12 is self-bonded directly to the cushioning layer 18, i.e., without the use of a separate adhesive layer.

An exterior cover 20 surrounds the cushioning layer 18 and is made of a durable, weather-resistant material such as natural leather, synthetic leather such as a mixture of synthetic fiber and polyurethane, canvas, or other synthetic resin sheet material, a thermoplastic. The cover 20 includes a seating portion 22 configured to support the rider and a skirt portion 23 which is folded around the support element.

When the seat 10 is designed for a motorcycle, it preferably is saddle-shaped, and includes a seating area 24 with a rearward concave area 25, a forward convex area 26, and a back portion 28. A pair of side panels 30 extend downwardly from the seating area 24.

Figure 2:
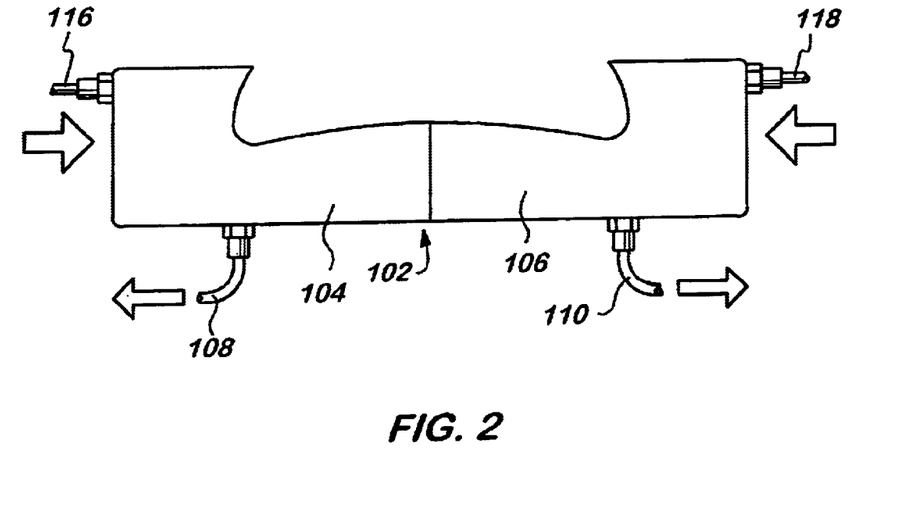
FIG. 2 is a cross sectional view of a lower mold element used to form the motorcycle seat according to the present invention.

In fabricating and assembling the vehicle seat 10, a mold set 100 having a lower element 102 and several upper elements is employed. The lower element 102, shown in FIG. 2, includes a first part 104 and a second part 106 that are horizontally disposed and abut one another. The first part 104 has a lower vacuum/pressure line 108 and an upper vacuum/pressure line 116. Each line is connected to a plurality of air channels 112, disposed within the first part 104, shown in FIG. 3. The second part 106 has a lower vacuum/pressure line 110 and an upper vacuum/pressure line 118. Similarly, a plurality of air channels (not shown) are disposed within the second part 106 and are connected to lines 110 and 118.

Figure 3:
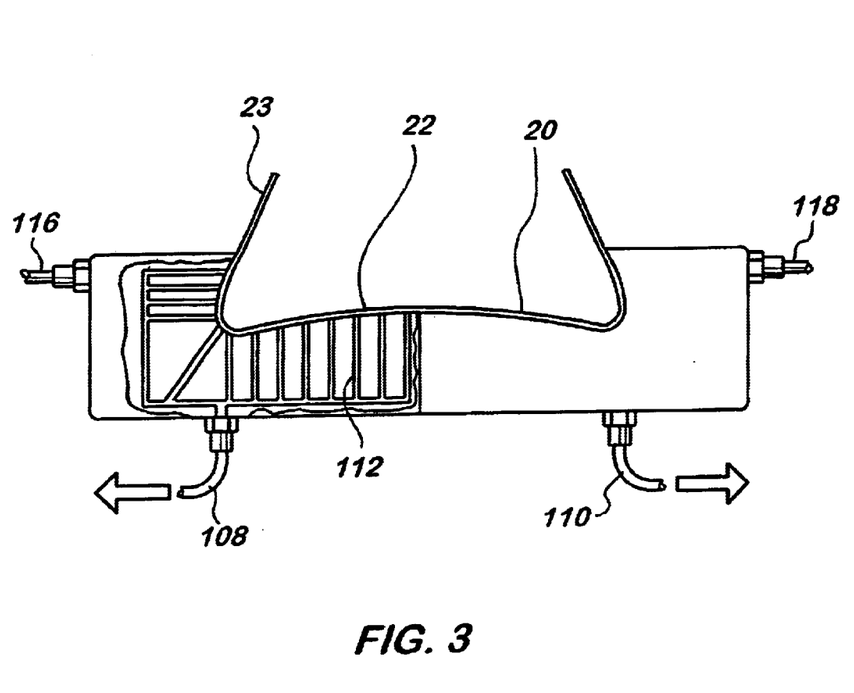
FIG. 3 is a similar view of the lower mold element in partially section to view a vacuum system used to position a sheet of cover material thereon.

As is shown in FIG. 3, in the first step of the process of the invention, the first and second parts 104,106 of the lower element are closed together and the vacuum in lines 108,110 is turned on. The pre-cut exterior cover 20 is placed on the lower element 102. The seating portion 22 is placed within the mold cavity of the lower element 102, and the surrounding skirt portion 23 extends outwardly from the mold cavity of the lower element 102.

Figure 4:
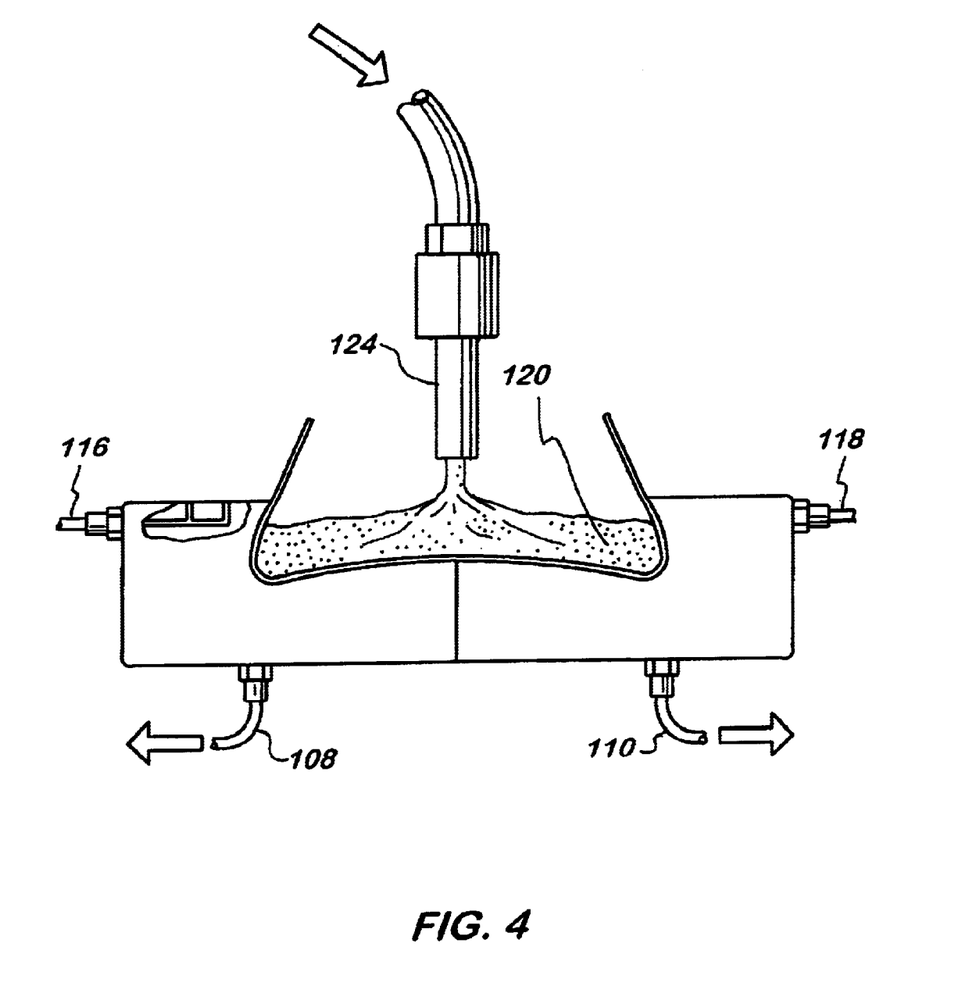
FIG. 4 schematically shows the step of dispensing a foamable synthetic resin into the lower element of the mold.
Figure 5:
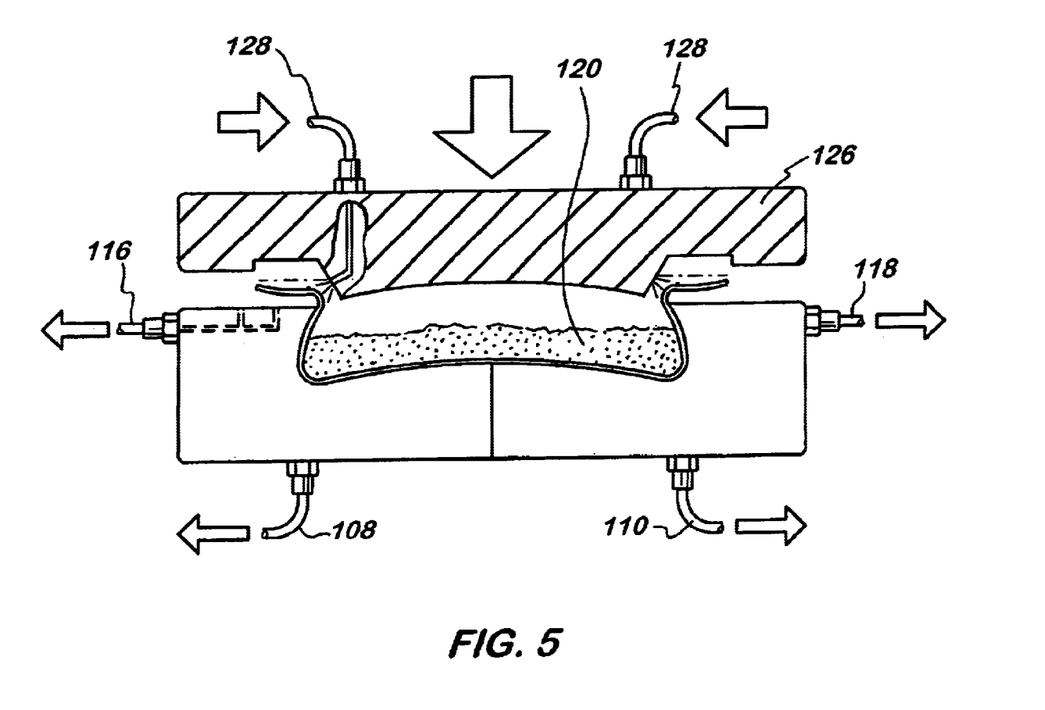
FIG. 5 schematically shows the lowering of a first upper element of the mold onto the lower mold element.
Figure 6:
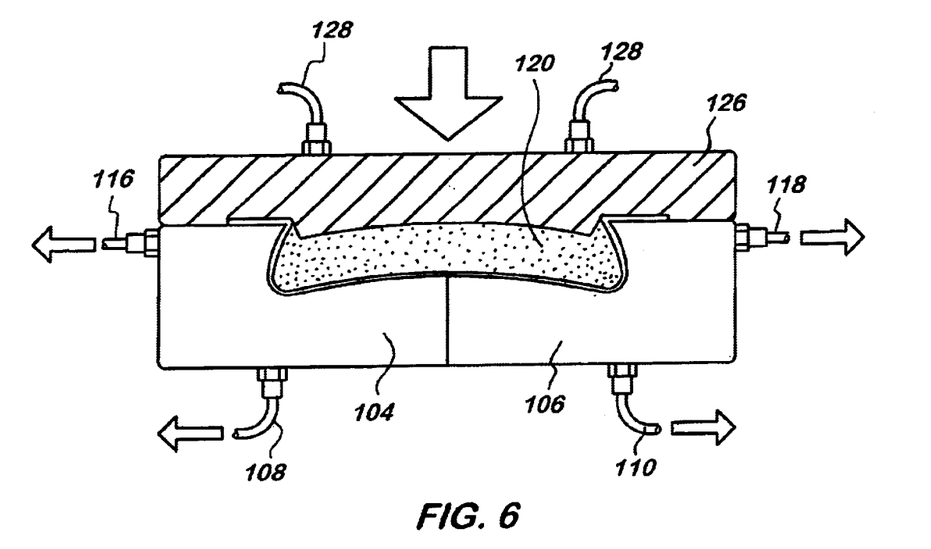
FIG. 6 schematically shows the step of curing the foamable synthetic resin to form a cellular cushioning layer.

As is illustrated in FIG. 4, a foamable first resin composition 120, used to form the cushioning layer 18, is dispensed into the lower element 102 through a nozzle 124. The resin composition 120 preferably is a castable polyurethane containing a blowing or foaming agent, but foamable synthetic resins may be employed. Subsequently, as is shown in FIGS. 5 and 6, a first upper element 126 of the mold is placed on the lower element 102. The first upper element 126 has a pair of air inlet lines 128 through which air is introduced to push the skirt portion 23 outwardly as the first upper element 126 is lowered. The first resin composition 120 is subjected to the desired heat cycle to expand the synthetic resin to form the foamed cushioning layer 18. During curing, the first resin composition 120 chemically and mechanically bonds to the inner surface of the cover 20 and will hold the cover material in the shape of the mold cavity after the seat 10 has been removed from the mold.

Figure 7:
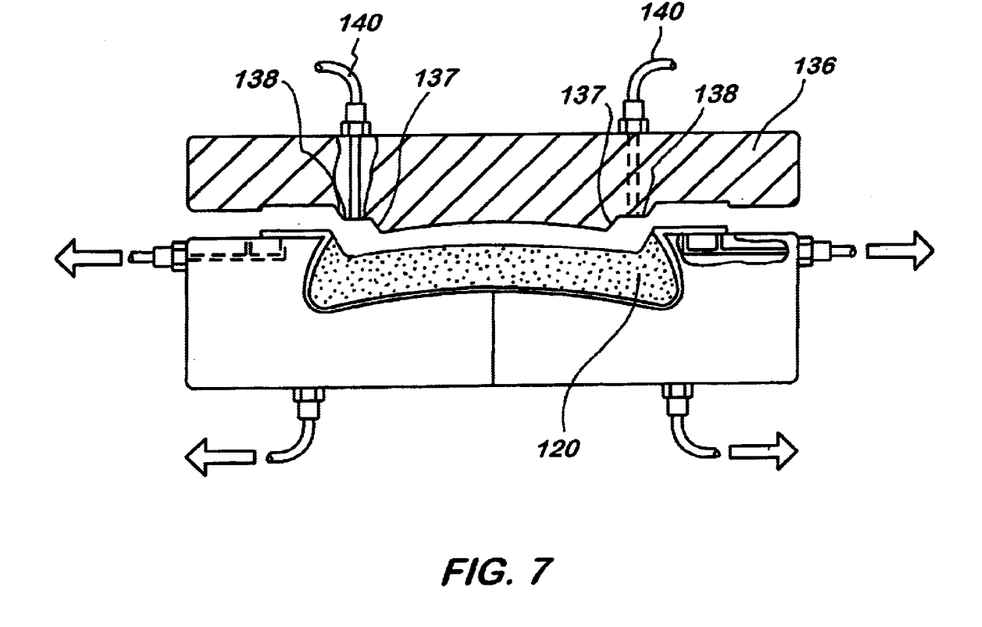
FIG. 7 schematically shows the lowering of a ring-forming upper mold element onto the lower mold element.
Figure 8:
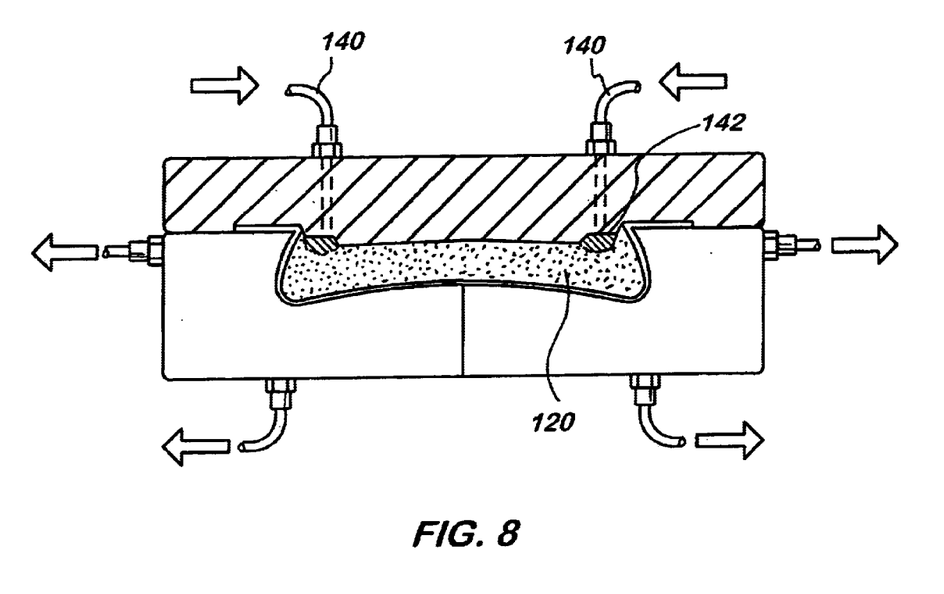
FIG. 8 schematically shows the step of reaction injection molding the support element.

After the first resin composition 120 is substantially cured, the first upper element 126 is removed and the support ring 16 is formed on the cushioning layer 18. In one embodiment, a preformed support ring 16 made of polyurethane, or another suitable thermoset or thermoplastic material, is placed on the cushioning layer 18 and the lower element 102. However, in the preferred embodiment as illustrated in FIGS. 7–8, the support ring 16 is formed in the mold. More particularly, a ring-forming upper element 136 is placed on the lower element 102. When the mold is closed, a ring-shaped cavity is defined by part of the top surface of cured first resin composition 120 and by walls 137, 138 of the ring forming element 136. A reaction injection moldable resin 142 is then injected into the closed mold through a plurality of ring material inlet lines 140 in the second upper element 136. The reaction injection moldable resin 142 is one which will form a durable ring upon curing. In a particularly preferred form of the invention, this material is a thermosetting polyurethane. The reaction injection moldable material 142 chemically and mechanically bonds to the cushioning layer 18 during reaction.

The ring-forming upper mold element 136 is subsequently removed and a base-forming upper element 144 is now coupled to the lower element in order to form the seat base. The base-forming upper element 144 has cavities therein in which are seated a pair of supports 146, 147 for supporting brackets 14, 15. The ends of brackets 14, 15 which are to be encapsulated in the seat base layer 12 extend downwardly from the base-forming upper mold element 144, as is shown in FIG. 9.

Figure 10:
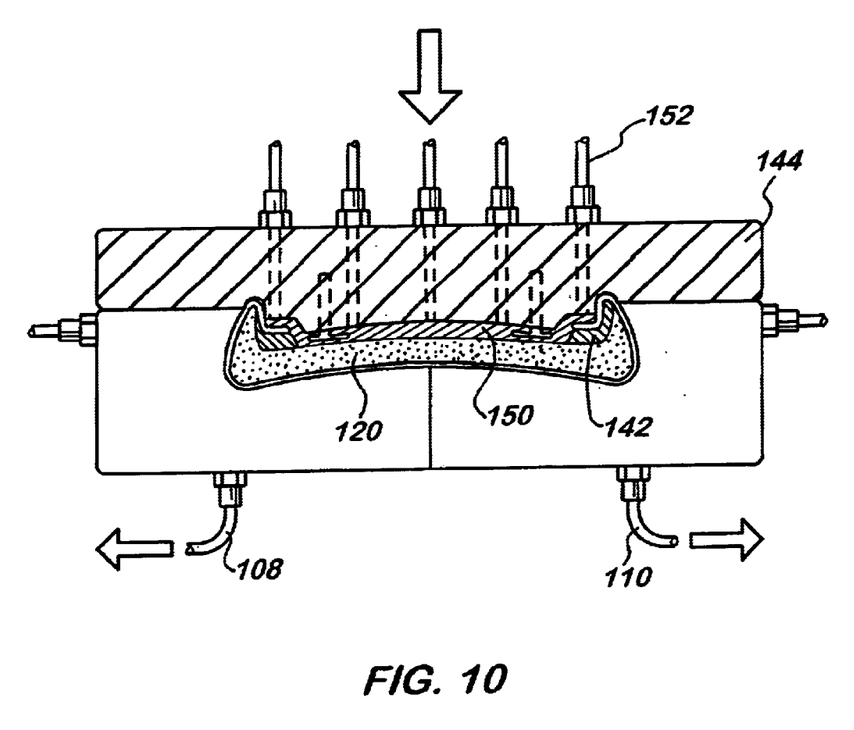
FIG. 10 schematically shows injection molding of the seat base.
Figure 11:
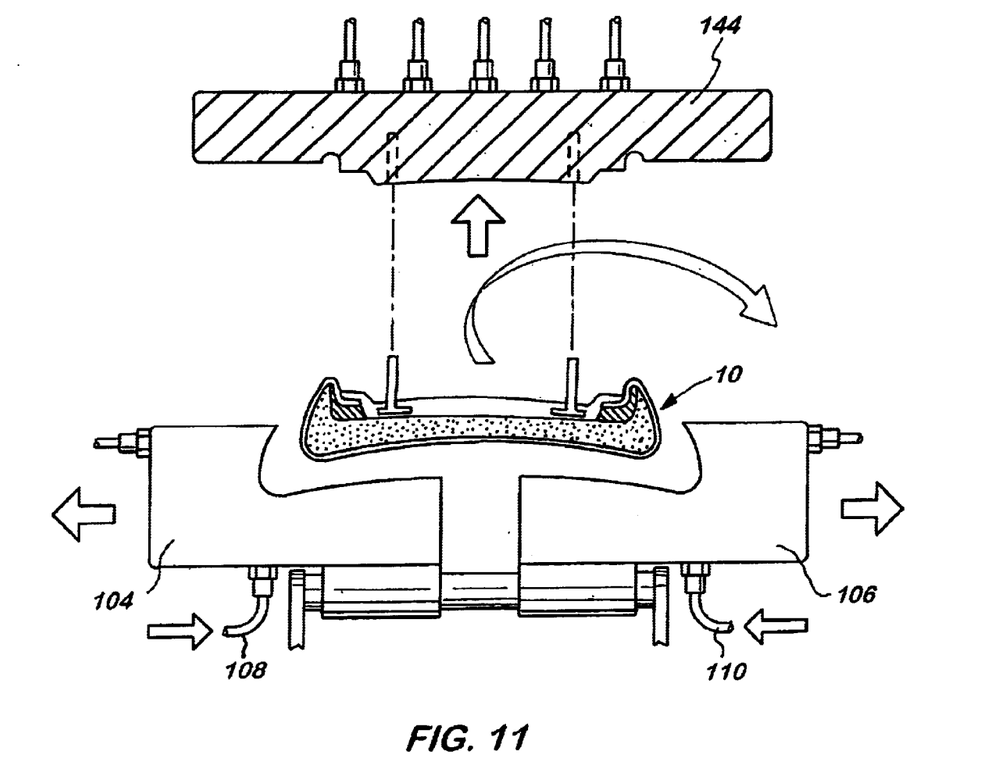
FIG. 11 schematically shows the ejection of the finished seat by air pressure.

After the base-forming upper element 144 secured to the lower element 102 as is shown in FIG. 10, a seat base resin 150 is injected into the mold through a plurality of injection lines 152 which are formed in the base-forming upper element 144. After injection, the seat base material 150 chemically and mechanically bonds to the cushioning layer 18 and inner edge of the support ring 16. The seat base material 150 is a rigid, high modulus moldable material, and preferably is an injection moldable material. Suitable resins include polyurethanes, epoxy and polyesters, with or without fillers or reinforcing fibers. It is noted that the seat base resin alternatively can be injection or compression moldable so long as an appropriate type of base-forming upper mold element is used.

Figure 9:
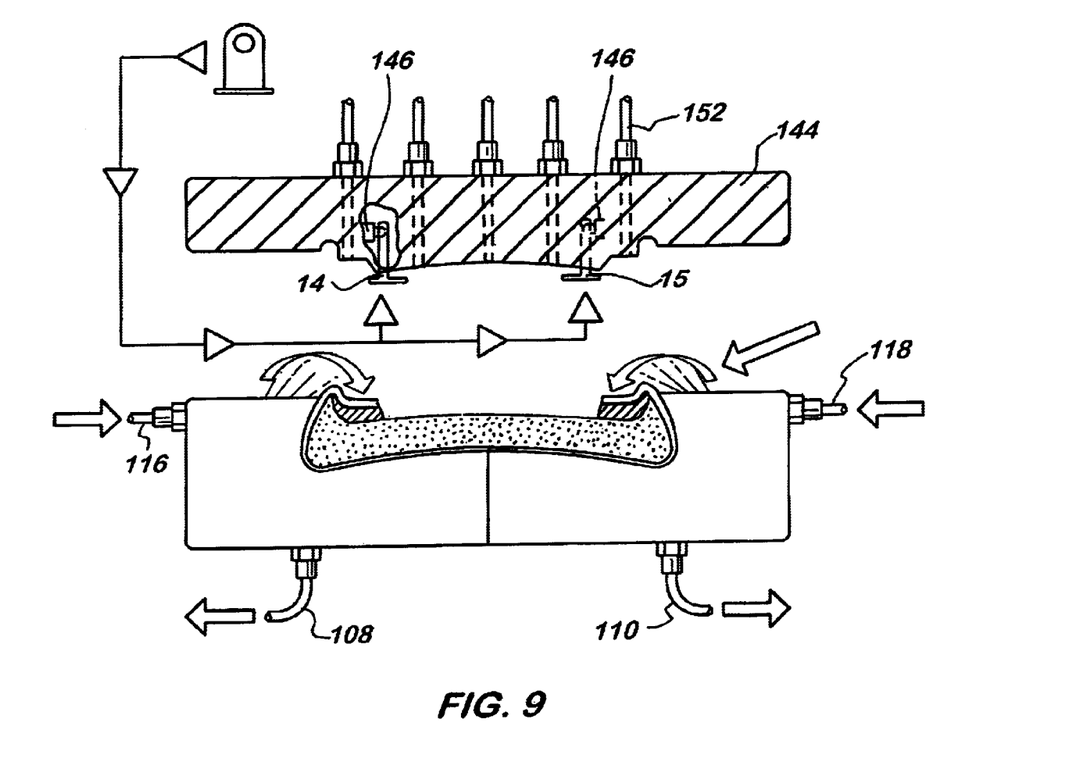
FIG. 9 schematically shows the mold with a second upper element having hardware supported therein.

In the particularly preferred embodiment of the invention shown in FIGS. 9 and 10, the skirt portion 23 of the exterior cover 20 is folded inwardly before the base-forming upper element 144 is lowered. Preferably, the skirt portion 23 is folded manually, or by injecting air inwardly through lines 116, 118. The seat base material 150 covers the skirt portion, thereby holding the skirt portion in place around the support ring 16. Alternatively, the seat base material 150 can be applied in two layers and the skirt portion 23 can be folded inward after application of the first layer in order to sandwich it between the two layers.

After curing of the seat base resin 150, the base-forming upper mold element 144 is removed and the first and second parts 104, 106 of the lower elements 102 are separated. Air pressure optionally is used in lines 108, 110 the lower element 102 to eject the vehicle seat 10 from the mold. The completed vehicle seat 10 is ready for installation on the motorcycle using brackets 14, 15.

Figure 12:
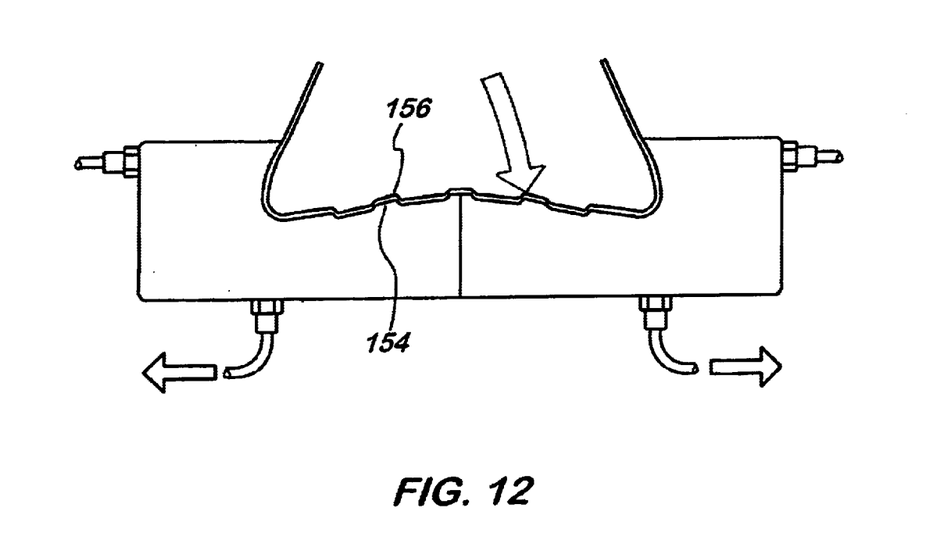
FIG. 12 schematically illustrates an alternative embodiment of a lower mold element to produce a contoured seat cover.

An alternative embodiment of the lower element of the mold is shown in FIG. 12 and is designated as 102. The inner mold surface has a patterned surface with embossing areas 154 which effectively emboss the outer surface of the seat base layer 12 during the molding process. The flexible foam of the cushioning layer mechanically and chemically bonds to the cover 20 when the cover 20 is pressed in the protrusions 154, causing the cover 20 to retain indentations 156 corresponding to the protrusions 154 upon removal from the mold set 100. As is well known, the mold elements can be heated by a heat exchange fluid or by resistance hiatus included therewithin.

Thus, it can be seen from the foregoing detailed specification and attached drawings that the method of the present invention provides a high quality vehicle seat that can be made efficiently using a single mold set. All operations are performed using the same lower mold element and a series of upper mold elements which cooperate therewith. Excellent shape retention of the cushioned seat is obtained by molding the cushioning layer 18 directly onto the cover 20. Reaction injection molding of the support ring, resulting in chemical and mechanical bonding of the ring to the cushioning layer 18, contributes to the durability of the seat. The skirt portion or cover layer is effectively held in place by sandwiching it within the base layer. Encapsulation of the brackets into the seat base layer further contributes to the stability of the resulting vehicle seat.

Having thus described the invention, what is claimed is:

1. In a method of making a vehicle seat, the steps comprising:
   (a) providing a seat mold having a lower element, and a plurality of upper elements, collectively defining a mold cavity of the configuration desired for the vehicle seat;
   (b) applying a seat cover on the surface of said lower element of said seat mold, said seat cover including a seating portion and a skirt portion extending upwardly along the inside periphery of said lower element of said mold;
   (c) introducing a first foamable synthetic resin into said lower element on the seating portion of the seat cover;
   (d) securing a first upper element of said seat mold on said lower element to form a closed cavity with a peripheral portion of said skirt portion of seat cover extending downwardly of said closed cavity;
   (e) at least partially curing said first foamable synthetic resin to form a cushioning layer;
   (f) removing said first upper element;
   (g) forming a generally ring-shaped support element about the periphery of said cushioning layer;
   (h) folding said skirt portion of said seat cover inwardly over said generally ring-shaped support element;
   (i) introducing a second synthetic resin into said mold cavity of said lower element of said seat mold on said cushioning layer;
   (j) securing a second upper element of said mold on said lower element of the mold to form a closed cavity;
   (k) curing said second synthetic resin to form the vehicle seat to form a base layer; and
   (l) removing said vehicle seat from said mold.

2. The method of making a vehicle seat in accordance with claim 1 wherein the step of forming said generally ring-shaped support element comprises reaction injection molding a resin directly on said cushioning layer.

3. The method of making a vehicle seat in accordance with claim 2 wherein said step (g) includes the steps of:
   (1) securing a second ring-forming upper mold element of the seat mold to said lower element; and
   (2) injecting a reaction injection moldable resin into said mold between the ring-forming upper mold element and said cushioning layer, the reaction injection moldable resin bonding to the cushioning layer during said reaction; and
   (3) removing the ring-forming upper mold element.

4. The method of making a vehicle seat in accordance with claim 3 wherein said reaction moldable resin is selected from the group consisting of polyurethane and polyesters.

5. The method of making a vehicle seat in accordance with claim 1 wherein said first foamable synthetic resin comprises a thermoset material.

6. The method of making a vehicle seat in accordance with claim 1 wherein said second synthetic resin providing said seat base layer comprises a thermoset material.

7. The method of making a vehicle seat in accordance with claim 1 wherein said seat cover is comprised of a material selected from the group consisting of natural leather, synthetic resins, and canvas.

8. The method of making a vehicle seat in accordance with claim 1 wherein step (a) includes providing a second upper mold element with hardware receiving cavities therein for seat hardware and step (j) includes inserting seat hardware into the second upper mold element to embed said hardware in said second synthetic resin.

* * * * *